(12) United States Patent  (10) Patent No.: US 7,379,094 B2
Yoshida et al.  (45) Date of Patent: May 27, 2008

(54) ELECTRONIC STILL IMAGING APPARATUS AND METHOD HAVING FUNCTION FOR ACQUIRING SYNTHESIS IMAGE HAVING WIDE-DYNAMIC RANGE

(75) Inventors: Hideaki Yoshida, Hachioji (JP); Masayu Higuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 1028 days.

(21) Appl. No.: 10/413,803

(22) Filed: Apr. 15, 2003

(65) Prior Publication Data

US 2004/0095472 A1  May 20, 2004

(30) Foreign Application Priority Data

Apr. 18, 2002 (JP) ............................. 2002-116559
Jun. 3, 2002 (JP) ............................. 2002-160929

(51) Int. Cl.
  H04N 5/228 (2006.01)
  H04N 5/225 (2006.01)
(52) U.S. Cl. ........................... 348/208.99; 348/208.12; 348/218.1
(58) Field of Classification Search ........... 348/208.99, 348/208.12, 218.1
  See application file for complete search history.

(56) References Cited

U.S. PATENT DOCUMENTS

| 4,642,683 | A | 2/1987 | Alkofer |
| 4,647,975 | A | 3/1987 | Alston et al. |
| 5,517,242 | A | 5/1996 | Yamada et al. |
| 5,671,013 | A | 9/1997 | Nakao |
| 6,429,895 | B1 * | 8/2002 | Onuki .................... 348/208.99 |
| 6,952,234 | B2 * | 10/2005 | Hatano ........................ 348/363 |
| 2003/0133035 | A1 * | 7/2003 | Hatano ........................ 348/362 |

FOREIGN PATENT DOCUMENTS

| JP | 2000-092378 | 3/2000 |
| JP | 2001-223932 | 8/2001 |
| JP | 2001-346096 | 12/2001 |
| JP | 2002-165138 | 6/2002 |

OTHER PUBLICATIONS

Japanese Office Action to Japanese Patent Application No. 2002-116559, mailed Jun. 26, 2007 (2 pgs.) with translation (2 pgs.).

* cited by examiner

*Primary Examiner*—James M. Hannett
(74) *Attorney, Agent, or Firm*—Straub and Pokotylo; John C. Pokotylo

(57) ABSTRACT

A still imaging apparatus includes an imaging device, a storage device, and a positional displacement correcting device. The imaging device continuously executes imaging of a plurality of times with exposure amounts different from each other. The storage device stores a plurality of original images acquired by the imaging of the plurality of times executed by the imaging device. The positional displacement detecting device detects positional displacements of common objects included in the plurality of original images stored in the storage device and stores a plurality of corrected original images whose positional displacements are corrected based on detected positional displacements in the storage device through updating.

8 Claims, 12 Drawing Sheets

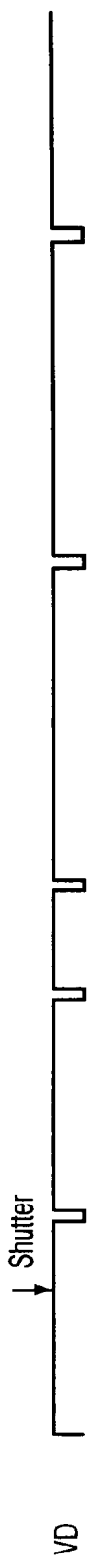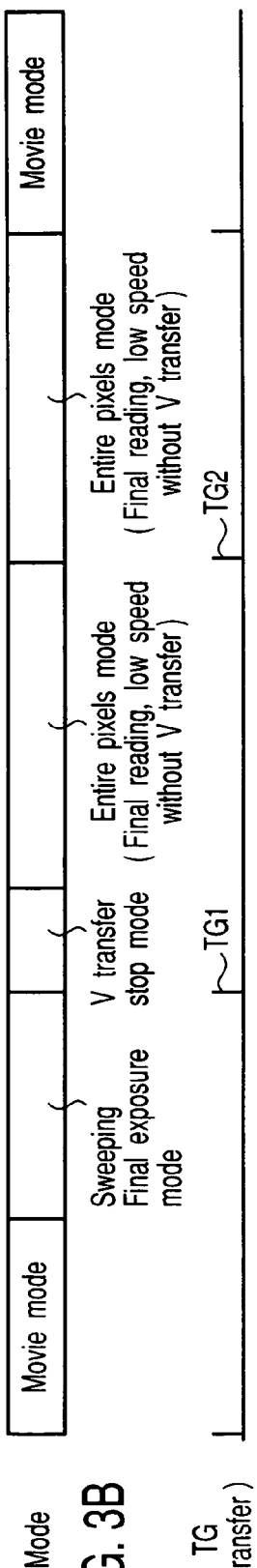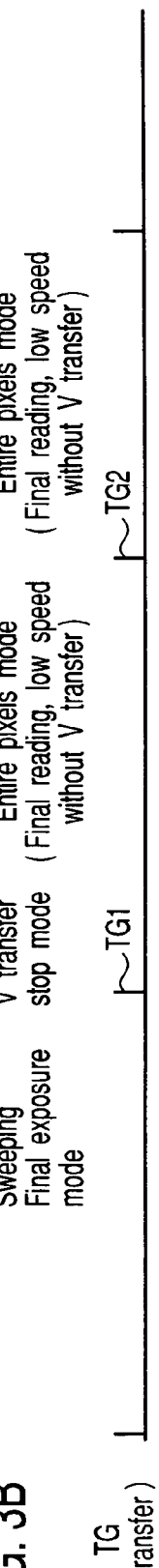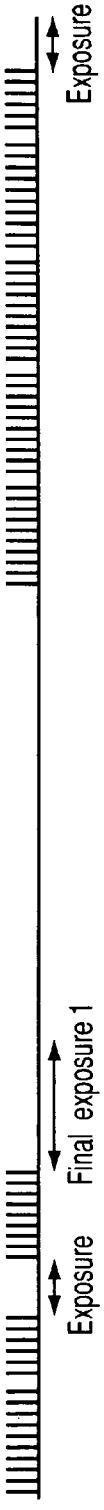

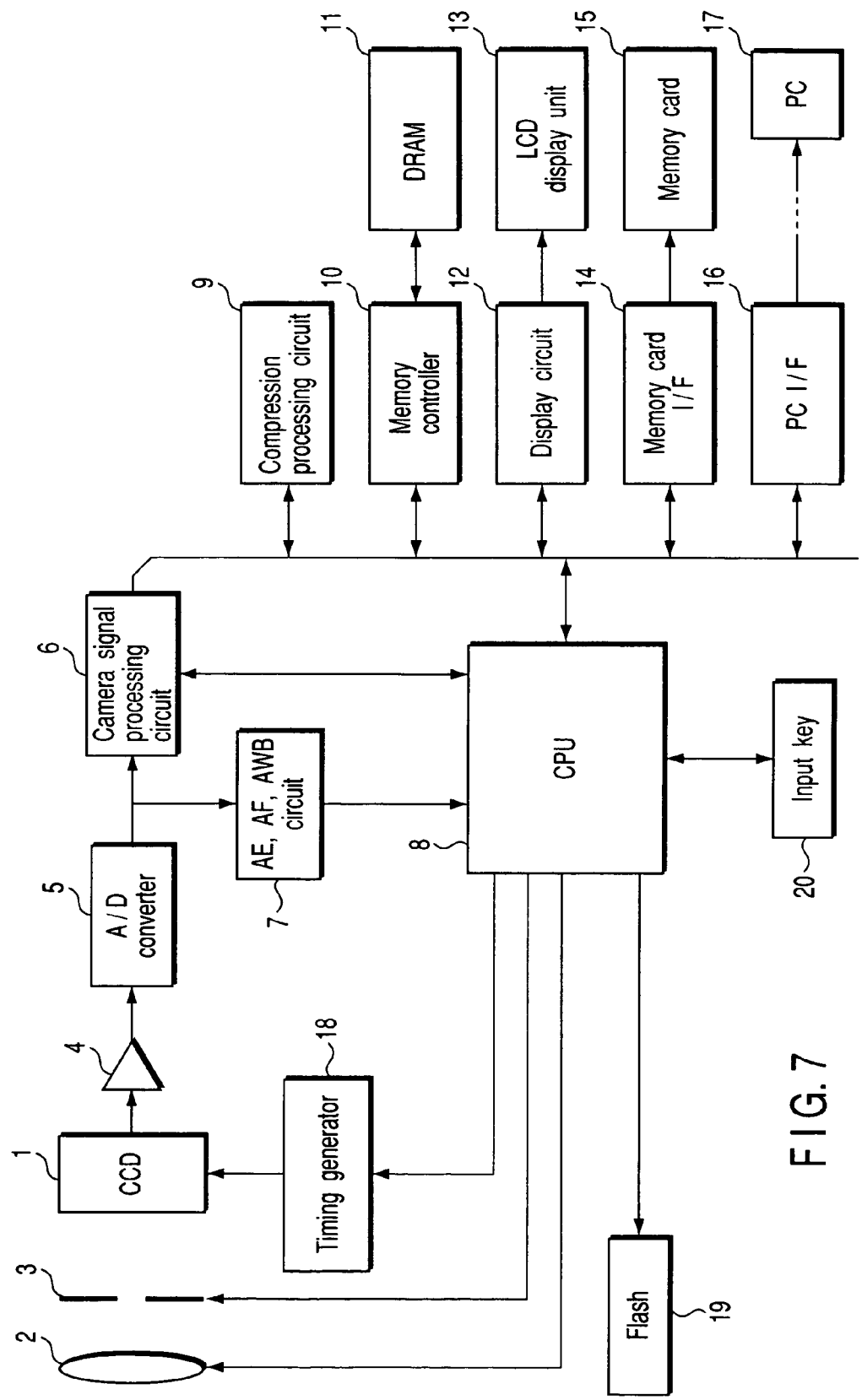
F I G. 7

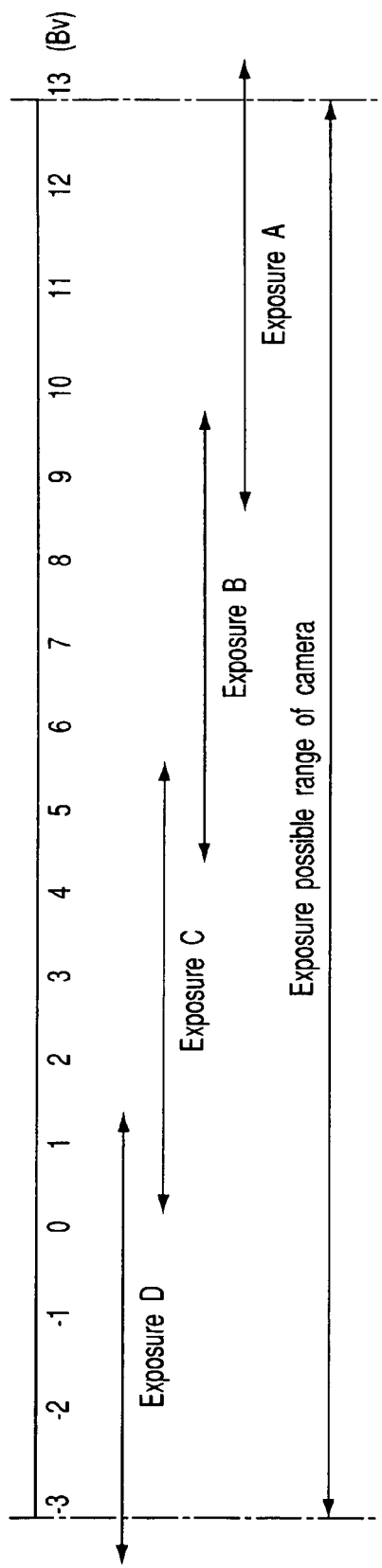
FIG. 14 (PRIOR ART)
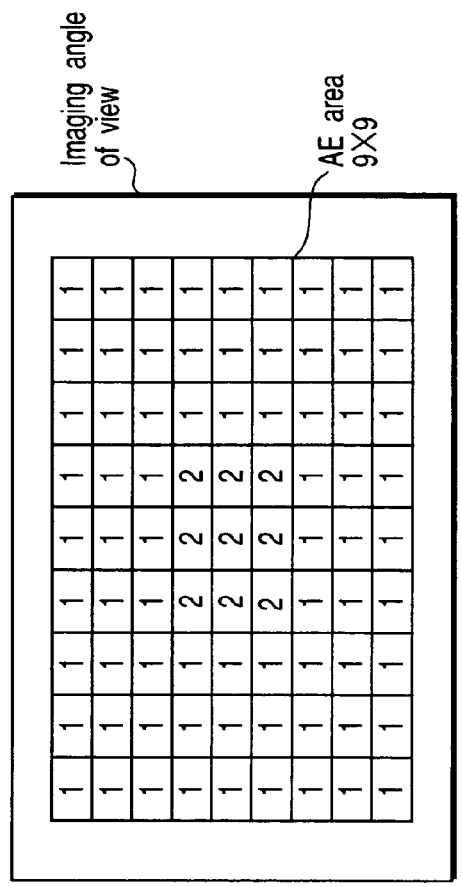
FIG. 16 (PRIOR ART)
| | Av | Tv | Sv | Bv |
|---|---|---|---|---|
| Exposure A | 3 | 13 | 5 | 11 |
| Exposure B | 3 | 9 | 5 | 7 |
| Exposure C | 3 | 5 | 5 | 3 |
| Exposure D | 3 | 5 | 9 | -1 |
FIG. 15 (PRIOR ART)

ELECTRONIC STILL IMAGING APPARATUS AND METHOD HAVING FUNCTION FOR ACQUIRING SYNTHESIS IMAGE HAVING WIDE-DYNAMIC RANGE

CROSS-REFERENCE TO RELATED APPLICATIONS

This application is based upon and claims the benefit of priority from the prior Japanese Patent Applications No. 2002-116559, filed Apr. 18, 2002, and No. 2002-160929, filed Jun. 3, 2002, the entire contents of which are incorporated herein by reference.

BACKGROUND OF THE INVENTION

1. Field of the Invention

The present invention relates to an electronic still imaging apparatus using a solid state imaging device such as a charge coupled device (CCD), etc., and more particularly to an electronic still imaging apparatus for executing dynamic rage expanded imaging for forming a single image by synthesizing a plurality of original images picked up in a different exposure amount, to an electronic still imaging apparatus and an electronic still imaging method having a function for acquiring a synthesis image having a wide dynamic range by synthesizing image signals of a plurality of images each having a different exposure amount and output from a solid state imaging device.

2. Description of the Related Art

Many trials have been proposed to execute dynamic-range-expanded imaging using an electronic still imaging apparatus, and, for example, an imaging system for synthesizing at least two original images acquired by being picked up in a different exposure amount has been known.

When a camera shake arises in imaging at a time this imaging system is employed, an image becomes blurred between timings at which an original image is picked up twice, thereby each pixel does not correspond to the same point of an object.

Accordingly, the image quality of a synthesis is collapsed, that is, it is extremely deteriorated to an unacceptable level.

Jpn. Pat. Appln. KOKAI Publication No. 2002-165138 discloses a technology for avoiding collapse of image quality by employing an imaging sequence in which two images are picked up particularly at continuous timing as well as by permitting to use dynamic-range-expanded imaging only when a shutter speed shorter than a predetermined camera shake limit shutter speed can be used.

Although this technology is very effective to avoid the collapse of the image quality, application of the dynamic-range-expanded imaging is limited only to an object having high luminance to which a high speed shutter can be used.

In general, in an electronic camera using a CCD imaging device, when an image is picked up using an AE exposure (preliminary imaging) and recorded, a pickup image signal is converted into digital image data by an A/D converter.

When it is assumed that the A/D converter has 10 conversion bits, the output value of the image data is located within the range of 0 to 1023.

Of the image data within this range, image data whose value is 32 or less on a dark side, for example, is less reliable by affecting on a noise.

Further, since it is contemplated that image data is partly saturated on a bright side, image data having a value up to about 960 can be used.

Accordingly, brightness that can be recognized within the usable data range of 32 to 960 is about 30 times (960/32≈30), and this brightness is expressed by about five stages of Bv (luminance) value.

In contrast, since an electronic camera ordinarily has 16 stages of exposure possible ranges Bv(−3) to Bv(13), it can be found that the camera cannot cover the entire extent of brightness when the AE exposure is executed once because the number of conversion bits of the A/D converter is ordinarily 10 bits.

Therefore, when a range covered by an exposure executed once is overlapped to realize the AE exposure in correspondence to the entire extent of brightness in the exposure possible range of the camera, the AE exposure must be executed about four times as shown by exposures A, B, C, D in FIG. 14.

The exposure conditions of the respective exposures A, B, C, D are ordinarily adjusted by an electronic shutter of a CCD imaging device and a gain of a CDS circuit.

FIG. 15 is a table showing examples of an exposure condition to the medians (11, 7, 3, −1) of the respective luminance values Bv of the exposures A, B, C, D of FIG. 14.

Here, Av shows an aperture value, Tv shows a shutter speed, and Sv shows sensitivity, respectively.

Note that the Av, Tv, and Sv values corresponding to the Bv value are calculated from a known program diagram as shown in FIG. 17.

The AE exposure condition of a final imaging is calculated from the image data acquired from the AE exposure executed four times as described above, and a method of calculating the exposure condition will be described below.

First, as shown in FIG. 16, a specific region within an imaging angle of view, from which an edge portion is removed, of a pickup image acquired by preliminary imaging executed four times is divided into 9×9 blocks, the average values of RGB signals in each divided block are calculated, and luminance Y' is calculated from the average values based on the following expression (1).

$$Y'=0.299R+0.587G+0.114B \quad (1)$$

A weighed average value Y is calculated by multiplying the luminance Y' by weighing coefficients (1 or 2) shown in the respective divided blocks shown in FIG. 16.

Then, the weighed average value Y is calculated as to the respective image signals acquired by the respective exposures A, B, C, D, and an AE exposure (preliminary imaging), which has a weighed average value within the range of 32-960, is selected from the four exposures A, B, C, D.

For example, it is assumed that the exposure C is selected and that Y=500.

At this time, the Bv value of an object is as shown in the following expression (2).

$$Bv=3(\text{aimed } Bv \text{ value of exposure } C)+\log_2[500/200 \\ (AE \text{ target value})]=4.3 \quad (2)$$

The expression (2) means that when an object having brightness of the Bv value (3) is picked up with the exposure C, Y is set to 200 and that a shift amount from Bv value(3) is determined from the ratio of the calculated weighed average value Y of luminance and 200 (AE target value).

The Tv and Av values are determined from the Bv value determined as described above using the program diagram shown in FIG. 17.

For example, when the intersection P of the vertical line of a Bv value 4.3 and the sensitivity line of an Sv value 4 (ISO: 50) is determined and the intersection Q of a slant line passing through the intersection P and the program block is determined, and the aperture value Av and the shutter speed Tv at the intersection Q show the exposure condition in this imaging.

Incidentally, a solid state imaging device such as a CCD imaging device, and the like is ordinarily used in imaging apparatuses such as TV cameras, video cameras, digital cameras, and the like.

However, the solid state imaging device is disadvantageous in that the dynamic range thereof is very narrow as compared with that of a silver salt photographic film.

To solve this drawback, there has been proposed a method of acquiring an image having a dynamic range expanded by reading out image signals of two images having a different exposure amount from a single imaging device and synthesizing them.

For example, Jpn. Pat. Appln. KOKAI Publication No. 2000-92378 proposes an imaging apparatus having a function of creating a synthesis image having a wide dynamic range by creating image signals of a plurality of images of the same object, the images each having a different exposure amount, that is, a long time exposure and a short time exposure and by subjecting the image signals to synthesis processing, wherein imaging can be executed by selecting one imaging mode from at least two imaging modes of an ordinary imaging mode, a forcible wide dynamic range imaging mode, and an automatic wide dynamic range imaging mode.

In an ordinary single exposure imaging, when light measuring processing is executed by executing a preliminary imaging exposure four times in order to determine a proper exposure condition, a predetermined time is taken from a time a shutter is pressed to a time a final exposure is executed, from which a considerably long time lag of the shutter arises.

A similar shutter time lag is also arisen in the imaging apparatus having the function for acquiring the image having the expanded dynamic range by reading out the imaging signals of the plurality of images having the different exposure amount from the single imaging device and by synthesizing the imaging signals, when light measuring processing is executed by executing a preliminary imaging exposure four times as in the imaging executed in the single exposure imaging in order to determine a proper exposure condition when exposures are executed four times under a different exposure condition or to set the number of times of exposures.

BRIEF SUMMARY OF THE INVENTION

According to a first aspect of the present invention, there is provided an electronic still imaging apparatus comprising:
an imaging device which continuously executes imaging of a plurality of times with different exposure amounts different from each other;
a storage device which stores a plurality of original images acquired by the imaging of the plurality of times executed by the imaging device, respectively; and
a positional displacement correcting device which detects positional displacements of common objects included in the plurality of original images stored in the storage device and stores a plurality of corrected original images whose positional displacements are corrected based on detected positional displacements in the storage device through updating.

According to a second aspect of the present invention, there is provided an electronic still imaging apparatus comprising:

a luminance range detecting device which discriminates a luminance range of a picture to be imaged in a plurality of stages;
an imaging device which continuously executes imaging of a plurality of times with exposure amounts different from each other according to a luminance range discriminated by the luminance range detecting device;
a storage device which stores a plurality of original images acquired by the imaging of the plurality of times executed by the imaging device, respectively; and
a synthesizing device which outputs an image signal whose dynamic range is expanded by synthesizing the plurality of original images stored in the storage device.

According to a third aspect of the present invention, there is provided an electronic still imaging method comprising:
detecting a luminance range in a picture to be imaged according to a result of preliminary imaging;
determining a number of times of an exposure which is executed by changing an exposure amount according to a detected luminance range;
storing a plurality of original images acquired by sequentially executing the exposure of a determined number of times, respectively;
detecting positional displacements of common objects included in stored plurality of original images and storing a plurality of corrected original images whose positional displacements are corrected based on detected positional displacements through updating; and
outputting an image signal whose dynamic range is expanded by synthesizing the plurality of corrected original images stored through updating.

According to a fourth aspect of the present invention, there is provided an electronic still imaging method of outputting an image signal whose dynamic range is expanded by synthesizing partial image signals in respective image signals acquired by continuously executing imaging of a plurality of times with exposure amounts different from each other, comprising:
detecting a luminance range of an object and appropriately setting a number of times of the imaging executed the plurality of times according to a detected luminance range of the object; and
detecting positional displacements of the object in imaging signals acquired by the imaging executed the plurality of times and correcting and synthesizing the imaging signals of the plurality of times based on detected positional displacements.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A to 3F are timing charts for explaining an imaging sequence for continuously picking up two images using two exposure times, that is, long and short exposure times;

FIG. 7 is a block diagram showing an arrangement according to a second embodiment of an electronic still imaging apparatus according to the present invention;

FIG. 14 is a view explaining a preliminary imaging mode when AE exposure information is acquired as to an exposure possible range of a conventional camera;

FIG. 15 is a table showing examples of an exposure condition corresponding to the medians (11, 7, 3, −1) of the respective Bv values of exposures A, B, C, D of FIG. 14;

FIG. 16 is a view showing a mode for divisionally measuring the light of an object when AE exposure is acquired by the conventional camera.

DETAILED DESCRIPTION OF THE INVENTION

Figure 1:
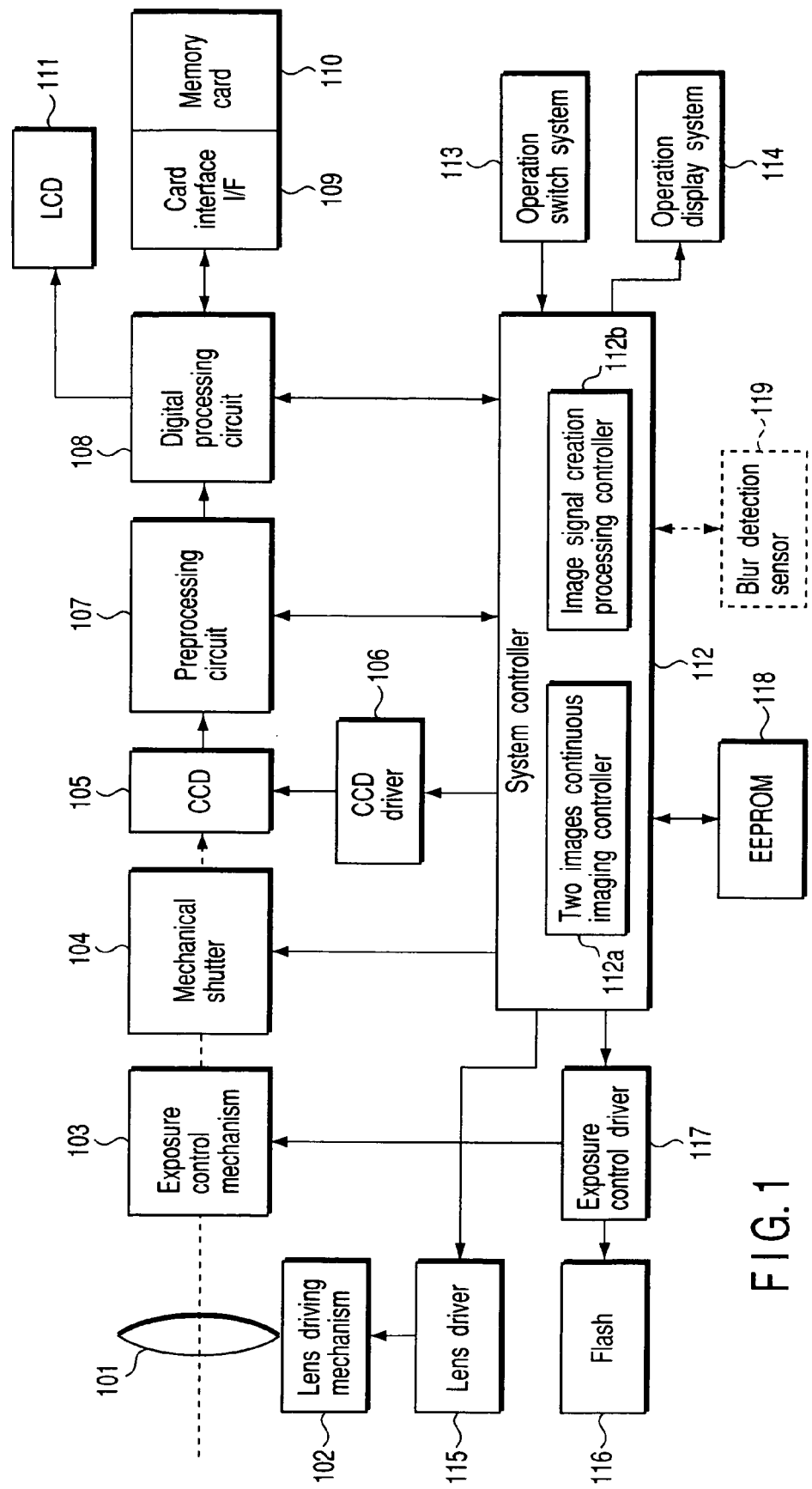
FIG. 1 is a block diagram showing an arrangement according to a first embodiment of an electronic still imaging apparatus according to the present invention.

Reference will now be made in detail to the embodiments of the invention as illustrated in the accompanying drawings, in which like reference numerals designate like or corresponding parts.

Embodiments of an electronic still imaging apparatus according to the present invention will be described below with reference to the drawings.

First embodiment

FIG. 1 is a block diagram showing an arrangement accordign to a first embodiment of an electronic still imaging apparatus according to the present invention.

FIG. 1 exemplifies a case where the first embodiment of the electronic still imaging apparatus according to the present invention is applied to a digital camera.

That is, as shown in FIG. 1, the electronic still imaging apparatus of the embodiment includes an imaging lens system 101 composed of various kinds of lenses (imaging lenses); a lens driving mechanism 102 for moving the lens system 101 forward and backward and driving a zoom lens and a focusing lens in the lens system 101; an exposure control mechanism 103 for controlling an aperture and a mechanical shutter 104 of the lens system 101; the mechanical shutter 104; a CCD imaging device (imaging device) 105 containing a color filter for subjecting an object image to photoelectric conversion; a CCD driver 106 for driving the imaging device 105, a preprocessing circuit 107 having an analog amplifier, an A/D converter, and the like; a digital processing circuit 108 for executing color signal creating processing, matrix conversion processing, compression/expansion processing, and other various kinds of processing; a card interface 109; a memory card 110; and an LCD image display system 111.

The electronic still imaging apparatus of the embodiment further includes a system controller (CPU) 112 for controlling respective units in their entirety; an operation switch system 113 composed of various kinds of switches such as a release switch, a setting button, and the like; an operation display system 114 for displaying a state of operation, a state of a mode, and the like; a lens driver 115 for controlling the lens driving mechanism 102; an electronic flash 116 acting as light emitting means; an exposure control driver 117 for controlling the exposure control mechanism 103 and the electronic flash 116; and a non-volatile memory (EEPROM) 118 for storing various kinds of set information, and the like.

In the electronic still imaging apparatus of the embodiment, the system controller 112 controls the apparatus in its entirety.

That is, the system controller 112 controls the exposure control mechanism 103, the mechanical shutter 104, and the CCD imaging device 105 driven by the CCD driver 106 so that an exposure (accumulated charge) and a signal are read out by the CCD imaging device 105.

The signal read out from the CCD imaging device 105 is subjected to A/D conversion in the preprocessing circuit 107 and captured by the digital processing circuit 108.

The digital processing circuit 108 subjects the captured signal to various kinds of signal processing and records a resultant signal in the memory card 110 through the card interface 109.

Note that an exposure control means is composed of the exposure control mechanism 103, the mechanical shutter 104, and a control unit thereof (including the system controller 112 and the exposure control driver 117).

It is assumed here that an interline progressive (sequential) scanning type CCD imaging device having a longitudinal overflow drain structure, for example, is used here as the CCD imaging device 105.

The CCD imaging device 105 is controlled using various kinds of drive signals (a charge transfer pulse TG, vertical/horizontal transfer pulse, a substrate-applied high voltage pulse VSUB, and the like) supplied from the CCD driver 106.

The CCD imaging device 105 is arranged as an ordinary interline type imaging device composed of charged accumulation units disposed in matrix and charge transfer units (vertical and horizontal charge transfer paths) disposed vertically and horizontally. When a charge transfer pulse TG is output, transfer gates, which are disposed between the respective charge accumulation units and the vertical charge transfer units, open and charges are transferred from the respective charge accumulation units to the vertical charge transfer paths corresponding thereto.

In this case, an exposure time is substantially controlled by a timing at which the charge transfer pulse TG is output.

Further, the substrate-applied high voltage pulse VSUB is used to forcibly discharge the charges of the charge accumulation units to a semiconductor substrate (substrate: vertical over flow drain (VOFD)).

Since the electronic still imaging apparatus (digital camera) of the embodiment executes operation and control similar to those of an ordinary digital camera except an image signal control processing for expanding a dynamic range for correcting a blur of a pickup image which will be described later in detail, the explanation of the known portion of the imaging apparatus will be omitted.

As shown in FIG. 1, the system controller 112 is provided with a two-image continuous imaging controller 112a and an image signal creation processing controller 112b which are a function for expanding a blur correction dynamic range as a feature of the embodiment.

The two-image continuous imaging controller 112a controls execution of an imaging sequence for acquiring two images (original image signals) having a different exposure amount without a time lag by continuously executing exposures for two exposure times, that is, for long and short exposure times to acquire a single still image finally.

The image signal creation processing controller 112b controls image signal creation processing for creating the single still image (synthesis image signals) by synthesizing the two images (original image signals) acquired under the control of the two-image continuous imaging controller 112a while correcting the positional displacement between the original image signals.

Next, an operation executed by the electronic still imaging apparatus according to the embodiment will be described.

An imaging range is not simply determined only by the imaging device but determined by overall processing including signal processing executed by the apparatus using the imaging device.

That is, the imaging range is limited by a saturation level of the imaging device on at least a high luminance side as well as limited by a noise level of an output from the imaging device assemble to the imaging apparatus on a low luminance side. Thus, an imaging range exceeding these limits cannot be acquired.

Figure 2:
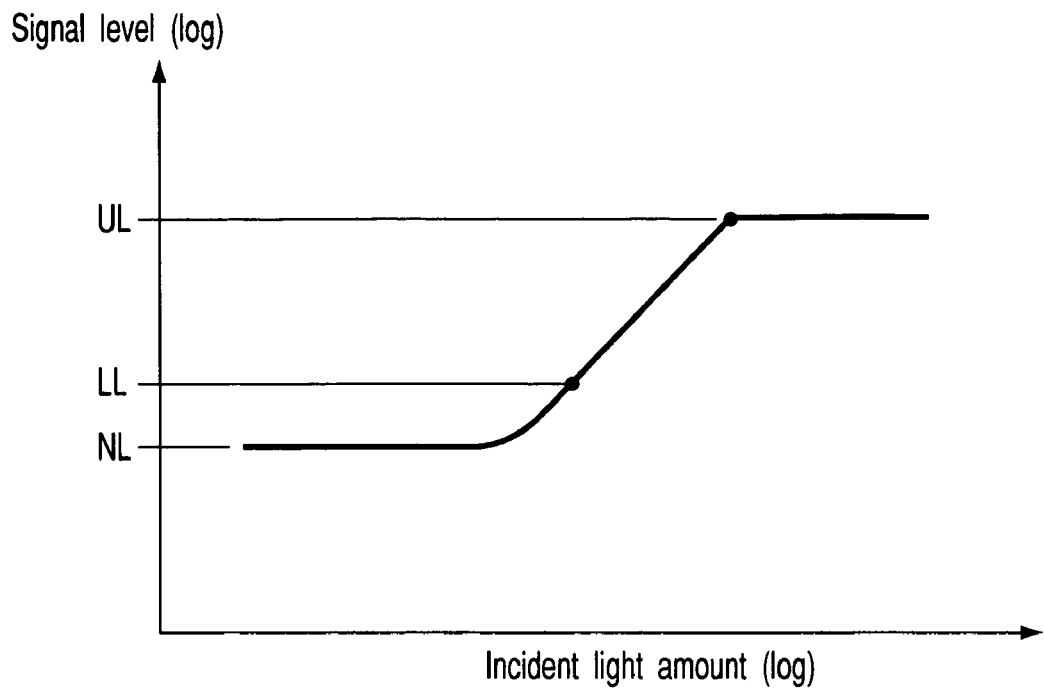
FIG. 2 is a graph showing photoelectric conversion characteristics of an ordinary imaging device when an imaging apparatus is composed of the imaging device.

When the imaging apparatus is arranged using an ordinary imaging device, photoelectric conversion characteristics of the imaging device are as schematically shown in, for example, FIG. 2.

In FIG. 2, a lateral axis logarithmically shows an amount of incident light, and a vertical axis logarithmically shows a signal level, respectively.

In FIG. 2, UL shows a high luminance side limit level and LL shows a low luminance level side limit level, respectively.

The high luminance side limit level UL is a level approximately corresponding to the saturation level of the imaging device.

In contrast, the low luminance side limit level LL does not correspond to the noise level NL itself but is determined as a signal level having a predetermined limit S/N ratio that withstands appreciation even if it coexists with noise.

Further, the low luminance side limit level LL may be set to such a level that is determined to be a limit when an image is visually evaluated using a determination criteria that "an image at a level lower than a particular level is entirely black and imperceptible".

An effective luminance level is set between the high luminance side limit level UL and the low luminance side limit level LL, and a difference therebetween on a logarithmic axis (DR=UL–LL) is used as an imaging range.

The difference DR is about 5 to 6 EV (30 to 36 dB) in many cases although it is different depending upon a design and manufacture condition of the imaging apparatus, and it is assumed that the imaging apparatus of the embodiment also has such an arrangement.

In the following explanation, a case where a monochrome image is picked up, is used as an example to simplify an explanation.

First, the imaging sequence for continuously picking up two images using the two long and short exposure times under the control of the two-image continuous imaging controller 112a will be explained with reference to timing charts shown in FIGS. 3A to 3F.

The imaging sequence shown in FIGS. 3A to 3F shows a drive method of picking up two images without a time lag by combining a progressive scanning (full frame reading) type CCD device disclosed in Jpn. Pat. Appln. KOKAI Publication No. 2002-165138 described above and a mechanical shutter.

This drive sequence can reduce the positional displacement of two original images when they are picked up using two long and short exposure times by making a time lag in the pickup operation as small as possible. Accordingly, the drive sequence in advantageous in that it can reduce necessity for correcting the positional displacement between the two images.

In FIG. 3A, VD shows a vertical synchronous signal.

However, since the vertical synchronous signal VD is rest as necessary, it can be said that this signal is a one frame operation start reference signal in this meaning.

In FIG. 3C, "TG" shows the charge transfer pulse for transferring signal charges from the charge accumulation units to the vertical charge transfer paths (VCCD).

In FIG. 3D, "V" shows a charge transfer pulse for transferring charges in the vertical charge transfer paths.

In FIG. 3E, VSUB shows the substrate-applied high voltage pulse for discharging the accumulated charges in the charge accumulation units to a substrate side.

FIG. 3F shows an open/close state of the mechanical shutter 104.

The mechanical shutter 104 is opened first and then closed.

Prior to "final exposure 1", the vertical charge transfer paths VCCD are driven in response to a V transfer pulse to discharge charges at a high speed in a state in which the mechanical shutter 104 is opened.

Further, the charges in the charge accumulation units are discharged to the substrate side in response to a VSUB pulse prior to the exposure.

The "final exposure 1" is started in response a minimum VSUB pulse, the signal charges in the charge accumulation units are transferred to the vertical charge transfer paths VCCD in response to a first charge transfer pulse TG1 as well as the "final exposure 1" is finished and a "final exposure" is started at the same time.

After the "final exposure 2" is finished by closing the mechanical shutter 104, a V transfer is executed to read out a first original image by the "final exposure 1".

Further, after the first original image is read, a second original image starts to be read out by the "final exposure 2" in response to a second charge transfer pulse TG2.

The first original image acquired by the "final exposure 1" is synthesized with the second original image acquired by the "final exposure 2" by the digital calculation processing executed by the digital processing circuit 108 under the control of the system controller 112 (image signal creation processing controller 112*b*), thereby a single still image is finally created.

Note that when blur correction of this embodiment, which will be described below in detail, is applied, even if the two original images are picked up at a slightly different timing, image quality is not deteriorated by synthesizing the images while correcting the positional displacement thereof.

Accordingly, it is possible to use an imaging sequence used in an ordinary electronic still imaging apparatus without using the imaging sequence shown in FIGS. 3A to 3F.

When the two original images are picked up, image signal processing is executed to create the single image by synthesizing the two original images by the digital processing circuit 108 as described below under the control of the system controller 112 (image signal creation processing controller 112*b*).

Figure 4:
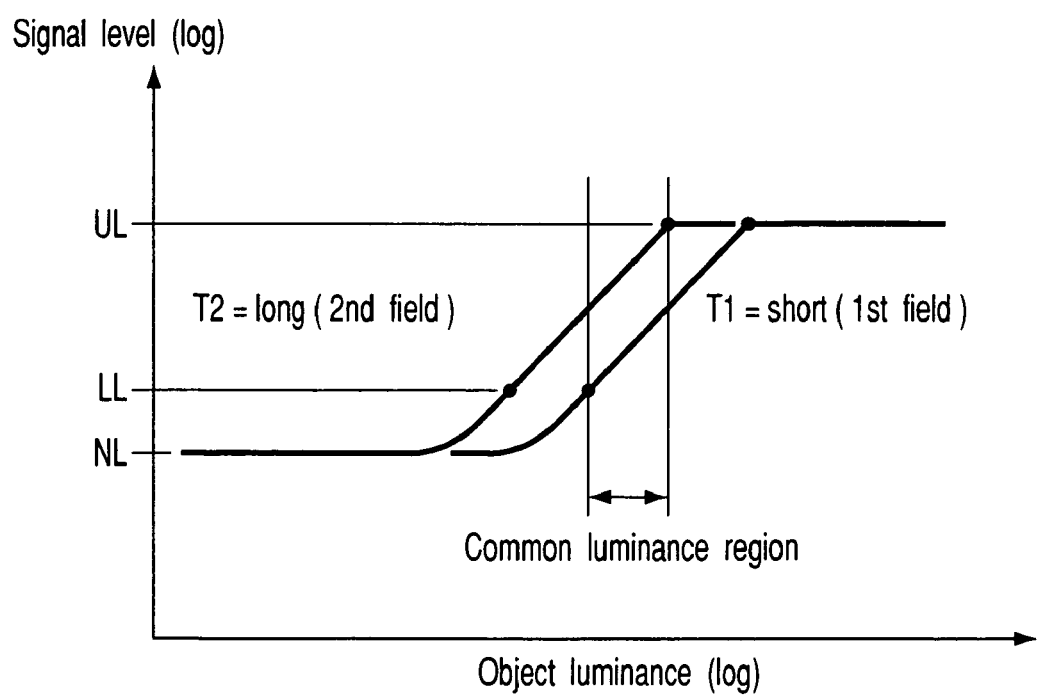
FIG. 4 is a graph showing the photoelectric conversion characteristics of pixel information signals of first and second original images read out from a CCD imaging device in FIG. 1.

The pixel information signals of the original images read out from the CCD imaging device 105 have photoelectric conversion characteristics as shown in FIG. 4 as to the first and second original images.

That is, the second original image (T2 in FIG. 4) is exposed for an exposure time longer than that of the first original image (T1 in FIG. 4), and the first and second original images are moved in parallel with each other right and left by an amount corresponding to the difference between the exposure times.

Note that the long and short exposure times of the first and second original images may be reversed at the time.

Figure 5:
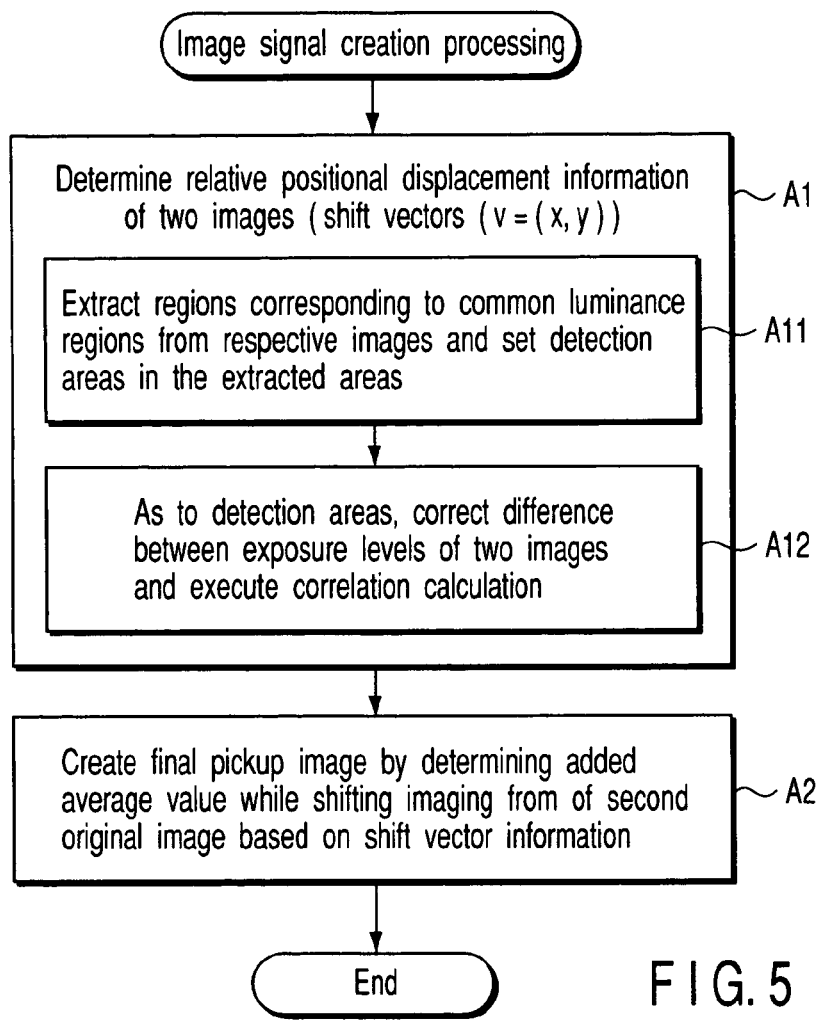
FIG. 5 is a flowchart explaining an image signal creation processing executed by the electronic still imaging apparatus shown in FIG. 1.

Next, the image signal creation processing in the embodiment will be explained with reference to the flowchart shown in FIG. 5.

The image signal creation processing is realized under the control of the image signal creation processing controller 112*b*.

In the following explanation, the image signal of the first original image is shown by S1 and the image signal of the second original image is shown by S2.

(1) Shift vector information showing the relative positional displacement between the two images, that is, the shift vector (V=(x, y)) thereof is determined by a calculating of a correlation therebetween (step A1).

Specifically, a predetermined partial area, which acts as a detection area, is disposed to an imaging frame, and the correlation evaluation value of the two images is calculated based on a certain assumed shift vector as to the detection area.

Then, correlation evaluation values are acquired each time the assumed shift vector V=(x, y) is changed, and the shift vector is set to a shift vector V which gives a minimum value (which corresponds to a maximum degree of correlation and is set to zero when the two images are in perfect agreement with each other) by comparing the respective correlation evaluation values with each other.

However, since each of the two images has a different exposure amount, processing must be executed as to the following two points.

First, a region used as the shift vector detecting area is set in a region common to the two images.

That is, regions corresponding to a common illumination region shown in FIG. 4 are extracted from the respective images of the signals S1 and S2, respectively, and the detection area is set so as to be included in the extracted regions (step A11).

Second, the correlation is calculated by correcting the difference between the exposure levels of the two images.

Here, the signal S1 acquired by the imaging with a low exposure is multiplied by an exposure time ratio g as a correction coefficient (step A12).

An example of the correlation evaluation value will be shown below.

$$\Sigma |g \cdot S1(i, j) - S2(i+x, j+y)| \qquad (1)$$

where, $\Sigma$ is a total sum sign as to i and j.

In this manner, the shift vector V=(x, y) is determined as a minimum value given to the correlation evaluation value.

(2) Next, a final pickup image Sout(i, j) is created by synthesizing the second original image with the first original image while shifting the imaging frame of the second original image based on the shift vector information detected in step A1 (step A2).

It is assumed here that the image is created by determining the weighed average value of the two images as an image synthesis method.

Figure 6:
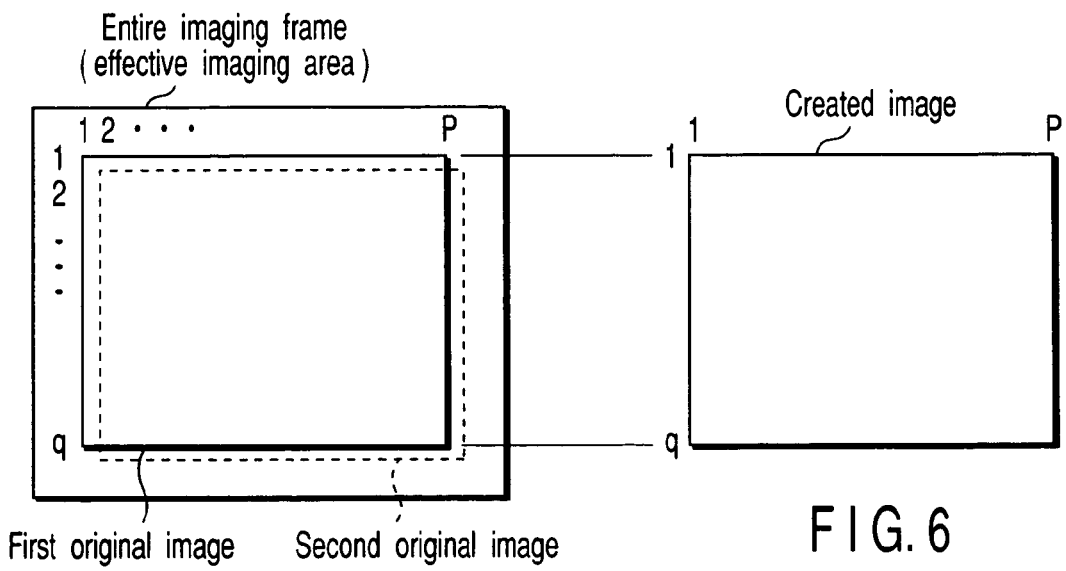
FIG. 6 is a view explaining the relationship between the first and second original images and an image created therefrom in the electronic still imaging apparatus of FIG. 1.

The pickup image Sout(i, j) has a predetermined number of pixels p×q ($1 \leq i \leq p$, $1 \leq j \leq q$) corresponding to the region having a created image size as shown on the right side of FIG. 6.

Note that the created image size is set slightly smaller than the entire image frame of imaging devices in consideration of a shift amount due to a blur as shown on the left side of FIG. 6.

Further, the center of a pickup image frame on a first exposure (first original image) is set at the center of an effective imaging area. However, to simplify explanation, it is assumed that the coordinate of the effective imaging area is set to have the same values as the coordinate (i, j) of the created image in this state.

Accordingly, there is also a coordinate having negative values outside of the created image frame in this state.

An equation for creating the pickup image is shown by the following expression (2).

$$Sout(i, j) = \{S1(i, j) + S2(i+x, j+y)\}/2 \qquad (2)$$

Note that although the first and second original images are synthesized with each other by calculating the added average value in the above explanation, any arbitrary method other than it may be used.

An image signal acquired by synthesizing the two images by the image signal creation processing is processed by a circuit in a latter stage, finally recorded in the memory card 110 or displayed on the LCD image display system 111.

As described above, even if a dynamic range expanded imaging is applied, the deterioration of image quality due to a camera shake can be avoided by executing the synthesis processing by the image signal creation processing while correcting the positional displacement between the two original images having the different exposure amount.

Accordingly, it is possible to apply the dynamic range expanded imaging to an object having a relatively low luminance value.

Note that although the above explanation is made as to the case where the monochrome image is picked up, the dynamic range expanded imaging can be also applied to a case where a color image is picked up.

When it is assumed that respective pixels have all the RGB information after synchronizing, even a single substrate device, for example, uses a luminance signal Y (may be replaced with a G signal), which is calculated by, for example, luminance matrix Y=0.299R+0.587G+0.114B, as the signals S1 and S2 in the detection of the shift vector (positional displacement) in step A1 of the image signal creation processing described above.

In the image creation calculation executed in step A2, a calculation for synthesizing images is executed to the RGB information similarly to the above based on the shift vector information detected using the luminance signal Y (or G signal).

Further, although detecting the shift vector information is excellent in that actually pickup images are used, the detection area is limited within the common luminance region.

In this case, there may be a case where the shift vector information cannot be detected because a portion belonging to the common luminance region does not exist depending on a distribution of luminance of an object.

This drawback can be coped with by the arrangements shown in the following modifications 1 and 2.

Modification 1

Prior to final imaging, shift vector information (positional displacement) is determined by a known correlation calculating method similarly to the above case based on image signals corresponding to a plurality of still images acquired in a monitor mode (ordinary movie output mode to which the expanded dynamic range is not applied), and the final one of the shift vector information (information just before the final imaging) is applied in the image signal creation processing (in place of the processing in step A11).

With this arrangement, the shift vector information can be acquired regardless of the distribution of luminance of the object.

It is also possible not only to determine the shift vector information prior to the final imaging but also to determine the shift vector information after the final imaging likewise, to calculate the average value of the shift vectors just before and just after the final imaging, and to apply the average value as the shift vector information.

In addition, it is also possible to apply the shift vector information determined after the final imaging.

Modification 2

To detect an amount of blur of the electronic still imaging apparatus, there is provided a blur detection sensor 119 (refer to FIG. 7) such as an acceleration sensor, an angular speed sensor, and the like.

The system controller 112 acquires information of the amount of blur of the electronic still imaging apparatus detected by the blur detection sensor 119 in the final imaging.

The image signal creation processing controller 112*b* determines shift vector information based on the amount of blur acquired by the blur detection sensor 119, and images are synthesized based on the shift vector information similarly to the case described above.

Further, the imaging apparatus of the embodiment can be modified as described below.

In the above explanation, the example in which the average value, which can be determined most simply by addition, is used to synthesize the two images, is shown. However, it is possible to use any other arbitrary synthesis processing method.

For example, it is possible to use a synthesis method utilizing fitting.

In the fitting synthesis method, original images are synthesized by, for example, fitting one of the original images into the region of the other original image which departs from the luminance range thereof or by comparing the image qualities (information) such as color information and partial contrast information of pixels with each other and employing a more preferable original image of each pixel.

In the two-image continuous imaging sequence, an amount for shifting exposure times may be arbitrarily set.

An exposure amount may be changed by a parameter (for example, a stopped-down amount of an aperture) other than the exposure time.

Moreover, although the case, in which the two images having the different exposure amount are synthesized, is exemplified to make the explanation simple, it is also possible to synthesize three or more images each having a different exposure amount.

In this case, for example, processing similar to that described above is applied to three images A, B, C having large, medium, and small exposure amounts.

The present invention is by no means limited to the embodiment described above and can be variously modified when it is embodied within a range which does not depart from the gist of the embodiment.

In addition, the embodiment described above includes inventions at various stages, and various inventions can be extracted by appropriately combining a plurality of indispensable elements disclosed.

For example, when an effect can be acquired even if some indispensable elements are deleted from all the indispensable elements shown in the embodiment, the indispensable elements from which the above indispensable elements are deleted can be extracted as an invention.

As described above in detail, according to the first embodiment of the electronic still imaging apparatus of the present invention, in the dynamic range expanded imaging for synthesizing a single image from a plurality of original images each having a different exposure amount, the image synthesis processing is executed while correcting the positional displacement between the respective original images. Accordingly, the deterioration of image quality due to a camera shake can be avoided even if the dynamic range expanded imaging is applied, and a wide dynamic range image can be acquired from an object having relatively low luminance.

Second embodiment

Next, a second embodiment of an electronic still imaging apparatus according to the present invention will be described.

FIG. 7 is a block diagram showing an overall electric arrangement of the second embodiment of the electronic still imaging apparatus according to the present invention.

That is, as shown in FIG. 7, the electronic still imaging apparatus according to the embodiment includes a single substrate color CCD imaging device 1, which photoelectrically converts an optical signal into an electric signal as well as has a function as an electronic shutter, a lens 2, an aperture/shutter mechanism 3, and an amplifier 4.

A single substrate color CCD imaging device, which photoelectrically converts the optical signal into the electric signal as well as has the function as the electronic shutter is used as the CCD imaging device 1.

An object image is input to the CCD imaging device 1 through the lens 2 and the aperture/shutter mechanism 3.

The output from the CCD imaging device 1 is amplified by the amplifier 4 after noise and the like are removed therefrom by a correlation double sampling circuit and the like.

The electronic still imaging apparatus of the embodiment further includes an A/D converter 5 for converting an output, which is analog data, from the amplifier 4 into digital data, a camera signal processing circuit 6 for processing an imaging signal from the CCD imaging device 1 as image data, an AF/AE/AWB circuit 7 composed of an AF circuit for capturing auto focus (AF) information for controlling focusing using a preliminary imaging signal from the CCD imaging device 1 prior to primary imaging, an AE circuit for capturing auto exposure (AE) information for controlling an exposure, and an AWB circuit for capturing auto white balance (AWB) information, and a CPU 8 for controlling the electronic still imaging apparatus in its entirety.

In response to an output signal from the AF/AE/AWB circuit 7, AF information is supplied to the lens 2, AE information is supplied to the aperture/shutter mechanism 3, and AWB information is supplied to the camera signal processing circuit 6 through the CPU 8, respectively.

The electronic still imaging apparatus of the embodiment further includes a compression processing circuit 9 for subjecting a data amount to compression processing (JPEG), a memory controller 10, a DRAM 11, a display circuit 12, an LCD display unit 13, a memory card interface 14, and a personal computer interface 16.

The image data compressed by the compression processing circuit 9 is recorded in a memory card 15 through the memory card interface 14.

The memory controller 10 and the DRAM 11 are used as working memories when the image data is subjected to color processing and the like.

The display circuit 12 and the LCD display unit 13 are used to read and display data recorded, for example, in the memory card 15 and to confirm an imaging state.

The personal computer interface 16 is an interface for transferring data recorded in the memory card 15 to a personal computer 17.

Note that, in FIG. 7, reference numeral 18 denotes a timing generator for generating a timing pulse for driving the CCD imaging device 1 and drives the CCD imaging device 1 under the control of the CPU 8.

In FIG. 7, reference numeral 19 denotes a flash mechanism that is controlled by the CPU 8 in response to the AE information acquired from preliminary imaging prior to the primary imaging and controls emission/non-emission of an electronic flash and an amount of light when the electronic flash is emitted.

Further, in FIG. 7, reference numeral 20 denotes an input key to the CPU 8, and various imaging modes and imaging scene modes can be set and various switches can be driven through the input key 20.

Next, an imaging/recording operation of the electronic still imaging apparatus arranged as described above will be described.

The embodiment is provided with an ordinary imaging mode and an SL imaging mode as the imaging modes. The ordinary imaging mode acquires an imaging signal of one image by imaging executed once based on ordinary AE information, whereas the SL imaging mode creates image signals of a plurality of images each having a different exposure amount by picking up the same object with a different exposure amount a plurality of times and acquires a synthesis image having a wide dynamic range (hereinafter, abbreviated as super latitude (SL)) by executing synthesizing processing. Both the imaging modes can be set through the input key 20 as well as the CPU 8 can automatically switch the above imaging modes deciding from a luminance value acquired by divisionally measuring the light of an image as described below.

When the ordinary imaging mode, in which SL imaging is not executed, is set, an imaging signal acquired based on the ordinary AE information by executing imaging once is converted into a digital signal in the A/D converter 5, subjected to predetermined signal processing in the camera signal processing circuit 6, subjected to compression processing in the compression processing circuit 9, and then recorded in the memory card 15.

Figure 8:
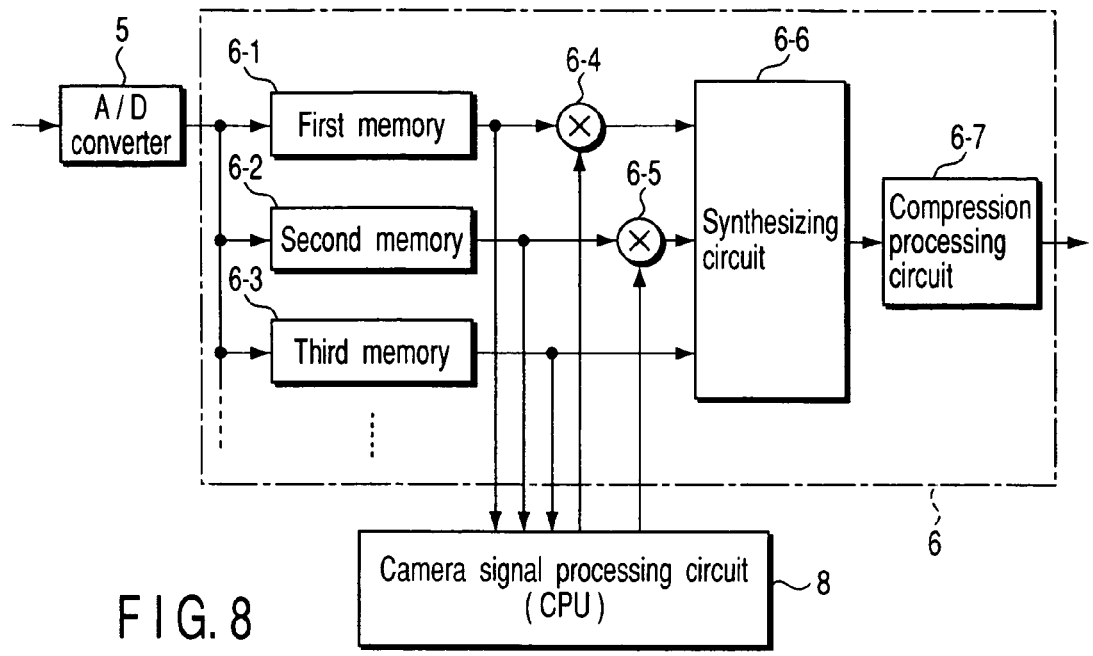
FIG. 8 is a block diagram showing an example of an arrangement of a camera signal processing circuit in FIG. 7.

In contrast, when the SL imaging mode is set, an SL synthesis image is created from the information acquired from the image signals of a plurality of images picked up in a different exposure amount, for example, from the information acquired from the image signals of three images using the camera signal processing circuit 6 arranged as shown in FIG. 8.

That is, as shown in FIG. 8, the camera signal processing circuit 6 includes a first memory 6-1, a second memory 6-2, a third memory 6-3, a multiplier 6-4, a multiplier 6-5, a synthesizing circuit 6-6, and a compression processing circuit 6-7. The first memory 6-1 stores short-time-exposed image data picked up under a short time exposure condition (large Bv value) determined based on the AE information which will be described next in detail. The second memory 6-2 stores first long-time-exposed image data picked up under a first long time exposure condition (medium Bv value) determined based on the AE information likewise. The third memory 6-3 stores second long-time-exposed image data picked up under a second long time exposure condition (small Bv value) determined based on the AE information likewise. The multiplier 6-4 multiplies the ratio of exposure amounts A (=LE1/SE) of the first long-time-exposed image to the short-time-exposed image by the short-time-exposed image data read out from the first memory 6-1. The multiplier 6-5 multiplies the ratio of exposure amounts B (=LE2/LE1) of the second long-time-exposed image to the first long-time-exposed image by the first long-time-exposed image data read out from the second memory 6-2. The synthesizing circuit 6-6 synthesizes a wide dynamic range synthesis image from the short-time-exposed image data subjected to the multiplying processing, the first long-time-exposed image data subjected to the multiplying processing, and the second long-time-exposed image data read out from the third memory 6-3. The compression processing circuit 6-7 compresses the SL synthesis image acquired by the synthesizing circuit 6-6 and outputs a resultant SL synthesis image.

Note that in the ordinary imaging mode in which the SL imaging is not executed, image data picked up with a single exposure is stored in, for example, the third memory 6-3 and output after it is compressed without being subjected to the synthesis processing.

Next, a first processing operation mode as to the AE exposure executed by the electronic still imaging apparatus according to this embodiment will be explained based on a flowchart shown in FIG. 9.

First, preliminary imaging is executed prior to the primary imaging, and the AE information is acquired using an imaging signal acquired from the CCD imaging device 1. In the first processing operation mode, preliminary imaging is executed once by selecting the exposure condition C (Av: 3, Tv: 5, Sv: 5, Bv: 3), in which the Bv value is slightly lower than a Bv median value, from the examples of the four preset AE exposure conditions previously shown in FIGS. 14 and 15 (step S1).

Then, similarly to the related art explained previously, an image picked up in the preliminary imaging executed under the above exposure condition C is divided into 9×9 blocks, and it is determined whether an object to be picked up has such brightness that it is exposed properly under the selected exposure condition C, the object is a brighter object, or it is a darker object based on the weighed average value Y of the luminance of the object acquired by giving weights to the average values of the RGB signals of the respective divided blocks (step S2).

When the weighed average value Y of the object luminance is within the range of 32 to 960 (32<Y<960), it is determined that the object is properly exposed.

When the weighed average value Y of the object luminance is 32 or less, it is determined that the object is the darker object.

When the weighed average value Y of the object luminance is 960 or more, it is determined that the object is the brighter object.

When it is determined in step S2 that the object is the darker object, imaging (SL imaging) is executed twice assuming that Bv values are 1 and −2 (step S3).

When it is determined that the object is the brighter object, imaging (SL imaging) is executed twice assuming that Bv values are 6 and 11 (step S4).

Figure 17:
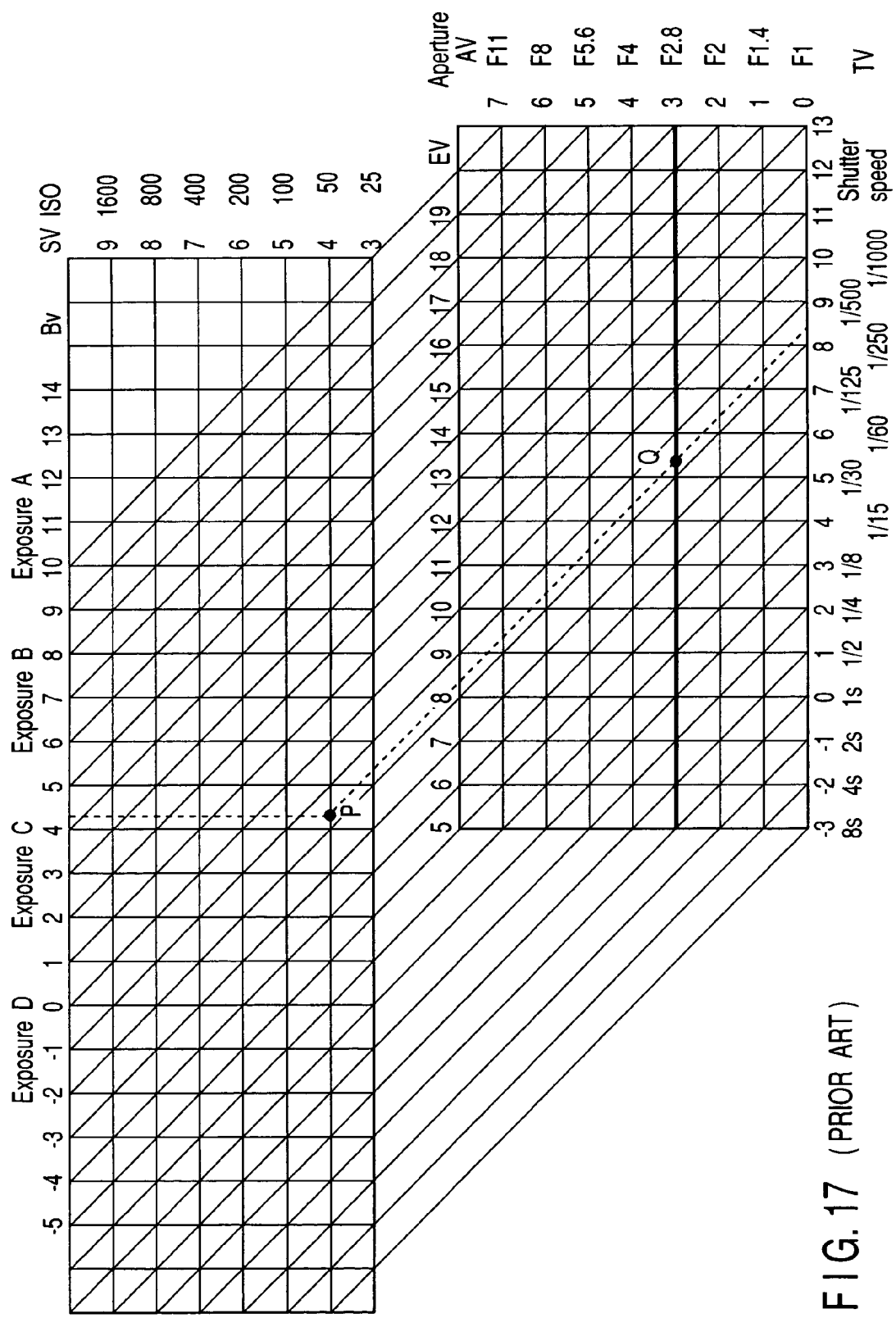
FIG. 17 is a diagram of a program for determining an exposure condition in imaging by a Bv value set by AE exposure of the conventional camera.

Note that, in this case, when the Bv values are set, exposure conditions in final imaging are determined, respectively using the program diagram of FIG. 17 similarly to the related art explained previously, and the final imaging is executed twice.

In contrast, when it is determined in the proper exposure determination step S2 that the weighed average value Y of the object luminance is within the range of 32 to 960 and the object is in the proper expose, the histogram of brightness (distribution of luminance) of the AE region of the preliminarily pickup image is analyzed (step S5).

Figure 10:
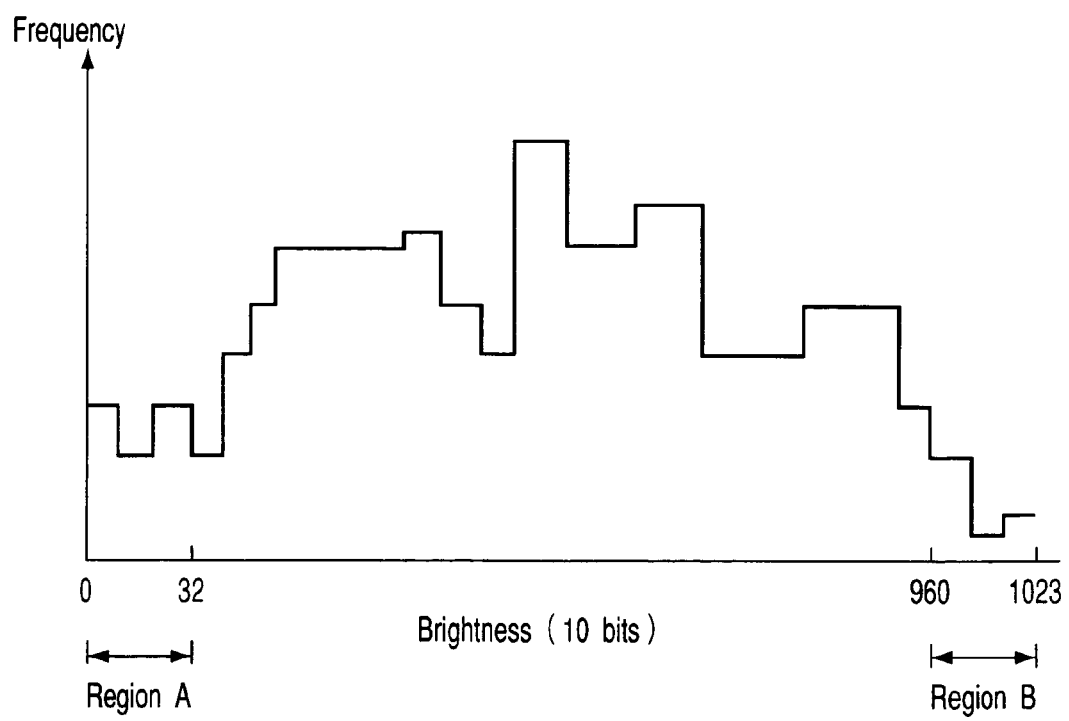
FIG. 10 is a histogram showing the distribution of luminance acquired by divisionally measuring the light of an object when AE information is acquired by preliminary imaging executed by the electronic still imaging apparatus of FIG. 7.

That is, a histogram of luminance is made based on the respective luminance values of the 9×9 divided blocks as shown in FIG. 10.

Note that, in FIG. 10, a lateral axis shows brightness (10 bits) and a vertical axis shows frequency (the number of blocks).

Next, first, it is determined whether or not the frequency of blocks existing in a region A having brightness of 32 or less is 5 or more based on the analysis of the histogram (step S6).

When it is determined that the frequency of the blocks existing in the region A having brightness of 32 or less is less than 5, it is determined whether or not the frequency of blocks existing in a region B having brightness of 960 or more is 5 or more (step S7).

When it is determined that the frequency of the blocks is less than 5, it can be found that only the small number of blocks of the object is excessively bright or dark. In this case, imaging is executed once in an ordinary imaging mode because it is meaningless to execute SL imaging a plurality of times, (step S8).

In this case, the Bv value (Bv1) is calculated by an ordinary calculation method using the expression (2) shown previously based on the weighed average value luminance value Y.

When it is determined in step S7 that the frequency of the blocks existing in the region B having brightness of 960 or more is 5 or more, it is determined that the considerable number of blocks of the object is excessively bright, and imaging (SL imaging) is executed twice (step S9).

The Bv values in this case are set to a Bv value (Bv1) calculated by an ordinary method similar to that of the imaging executed once and to a Bv value (Bv2), that is, (Bv1+3) which is acquired by adding 3 to the Bv value (Bv1).

That is, when Bv1 is set to, for example, 3, Bv2 is set to 6.

When it is determined in step S6 that the frequency of the blocks existing in the region A having brightness of 32 or less is 5 or more, it is determined next whether or not the frequency of the blocks existing in the region B having brightness of 960 or more is 5 or more (step S10).

When it is determined that the frequency of the blocks is less than 5, it is determined that the considerable number of blocks of the object is dark, and imaging (SL imaging) is executed twice (step S11).

The Bv values in this case are set to a Bv value (Bv1) calculated by the ordinary method similar to that of the imaging executed once and to a Bv value (Bv2), that is, (Bv1−3) which is acquired by subtracting 3 from the Bv value (Bv1).

That is, when Bv1 is set to, for example, 3, Bv2 is set to 0.

When it is determined in step S10 that the frequency of the blocks existing in the region B having brightness of 960 or more is 5 or more, it is determined that the considerable number of blocks of the object is excessively bright as well as the considerable number of blocks of the object is dark, and imaging (SL imaging) is executed thrice (Step S12).

The Bv values in this case are set to a Bv value (Bv1) calculated by the ordinary method similar to that of the imaging executed once, to a Bv value (Bv2), that is, (Bv1+3) which is acquired by adding 3 to the Bv value (Bv1), and to a Bv value (Bv3), that is, (Bv1−3) which is acquired by subtracting 3 from the Bv value (Bv1).

Imaging exposure conditions are set using the program diagram based on the Bv values in the respective imaging operations determined as described above and imaging is executed the predetermined number of times, and when SL imaging is executed, synthesis processing is executed.

According to the first AE processing operation mode described above, since the number of times of imaging and the imaging exposure condition are set by the luminance value acquired by measuring light in the preliminary imaging executed once, a shutter time lag can be reduced as compared with a case where preliminary imaging is executed four times as in the prior art.

Figure 11:
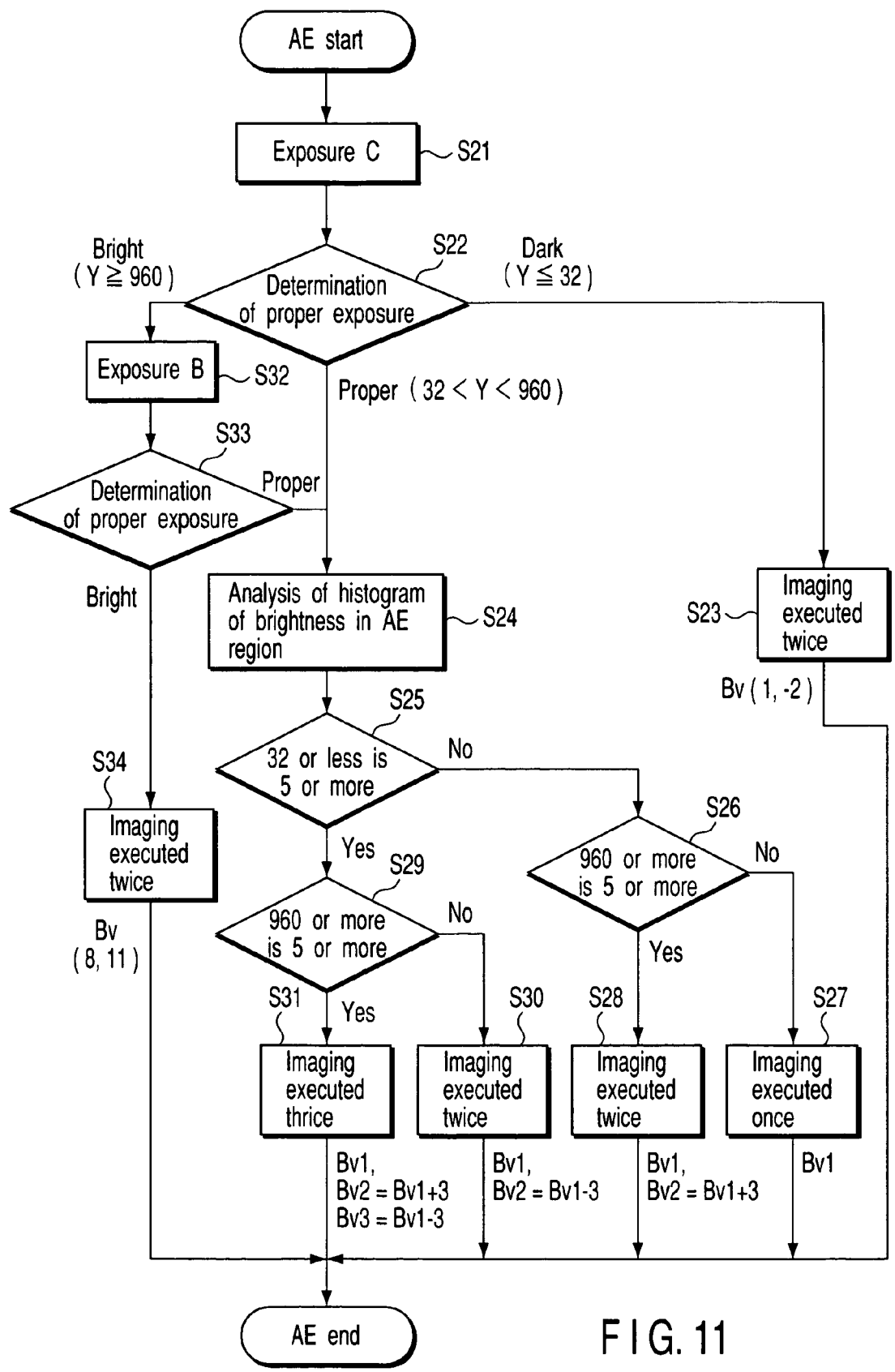
FIG. 11 is a flowchart explaining a second AE exposure processing mode executed by the electronic still imaging apparatus of FIG. 7.

Next, a second AE exposure processing mode will be explained with reference to the flowchart shown in FIG. 11.

In the second AE exposure processing mode, first, the exposure condition C is selected and preliminary imaging is executed once (step S21).

Then, the weighed average value Y of object luminance is determined from a pickup image acquired in the same manner, and it is determined whether the object has such brightness that it is properly exposed under the exposure condition C, the object is a brighter object, or it is a darker object (step S22).

When it is determined that the object is the darker object, imaging (SL imaging) is executed twice assuming that Bv values are 1 and −2 (step S23).

Further, when it is determined that the object is properly exposed under the exposure condition C, the histogram of brightness of the AE region of a preliminarily pickup image is analyzed likewise (step S24).

Next, it is determined whether or not the frequency of blocks in the region A having brightness 32 or less is 5 or more (step S25).

When it is determined that the frequency of the blocks is less than 5, it is determined next whether or not the frequency of blocks existing the region B having brightness of 960 or more is 5 or more (step S26).

When it is determined that the frequency of the blocks is less than 5, imaging is executed once in an ordinary mode (step S27).

When it is determined that the frequency of the blocks is 5 or more, imaging (SL imaging) is executed twice (step S28).

Further, when it is determined that the frequency of the blocks existing in the region A having brightness of 32 or less is 5 or more, it is determined next whether or not the frequency of the blocks existing in the region B having brightness of 960 or more is 5 or more (step S29).

When it is determined that the frequency of the blocks is less than 5, imaging (SL imaging) is executed twice (step S30).

When the frequency of the blocks is 5 or more, imaging (SL imaging) is executed thrice (step S31).

Figure 9:
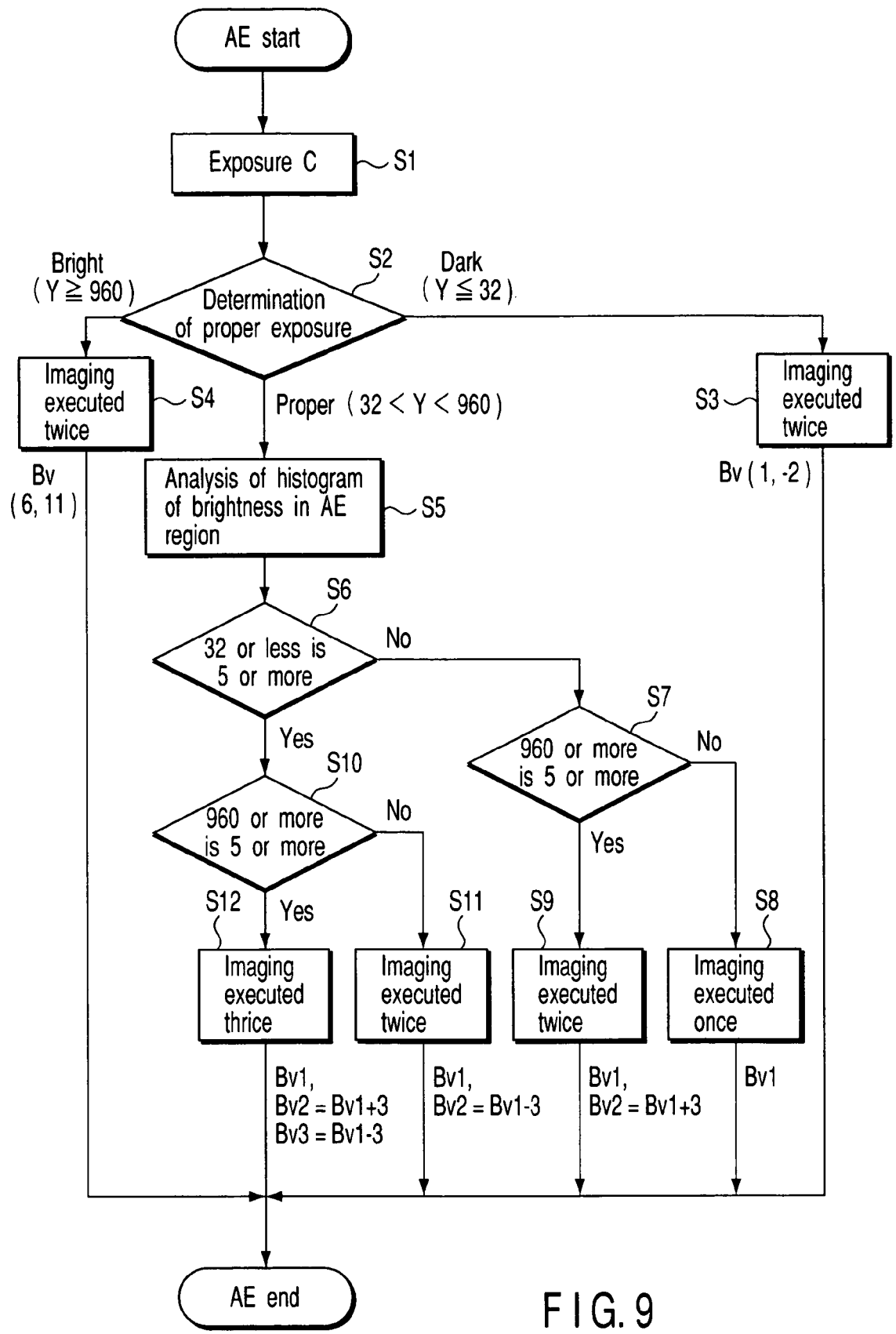
FIG. 9 is a flowchart explaining a first AE exposure processing mode executed by the electronic still imaging apparatus of FIG. 7.

The operation executed from step S21 to step S31 in the the second AE exposure processing mode is essentially the same as that of the first AE exposure processing mode shown in FIG. 9. However, the second processing mode has a feature in step S23 as described below. That is, when it is determined that the object is the brighter object in the proper exposure determination step 22, the exposure condition B (Av: 3, Tv: 9, Sv: 5, Bv: 7), which is adjacent to the exposure condition C and has the Bv value higher than that of the exposure condition C, is selected and second preliminary imaging is executed (step S32), different from the first AE exposure processing mode in which imaging is instantly executed twice.

That is, when it is determined that the object is the brighter object in the proper exposure determination step 22, the second preliminary imaging is executed under the exposure condition B, and whether or not the object is properly exposed is determined based on the weighed average value Y of the luminance value of a pickup image acquired in the second preliminary imaging (step S33).

Then, when it is determined that the object is the brighter object also in the second preliminary imaging executed under the exposure condition B, an exposure condition for executing imaging twice is determined assuming that Bv values are 8 and 11, and the imaging (SL imaging) is executed twice (step S34).

When it is determined in the proper exposure determination step S33 that the object is properly exposed in the preliminary imaging executed under the exposure condition B, the process goes to step S24 at which the histogram of brightness of the AE region is analyzed similarly to the case where it is determined that the object is properly exposed in the proper exposure determination step S22, and thereafter imaging is executed once to thrice based on the result of histogram analysis (steps S25 to S31).

As described above, in the second exposure processing mode, preliminary imaging is executed twice under the exposure conditions C and B to the object when it is a bright object. Thus, even if the object is the bright object, imaging is not limited to SL imaging executed twice, and when the object has a low contrast, imaging can be executed once in the ordinary imaging mode, thereby the SL imaging can be executed accurately only when it is necessary.

Next, a third AE exposure processing mode will be explained with reference to the flowchart shown in FIG. 12.

In the third AE exposure processing mode, the histogram analyzing step and subsequent steps for executing processing operation in the first AE exposure processing mode shown in the flowchart of FIG. 9 are omitted and imaging (SL imaging) is executed twice at all times based on the luminance value of a pickup image acquired in preliminary imaging executed once.

Figure 12:
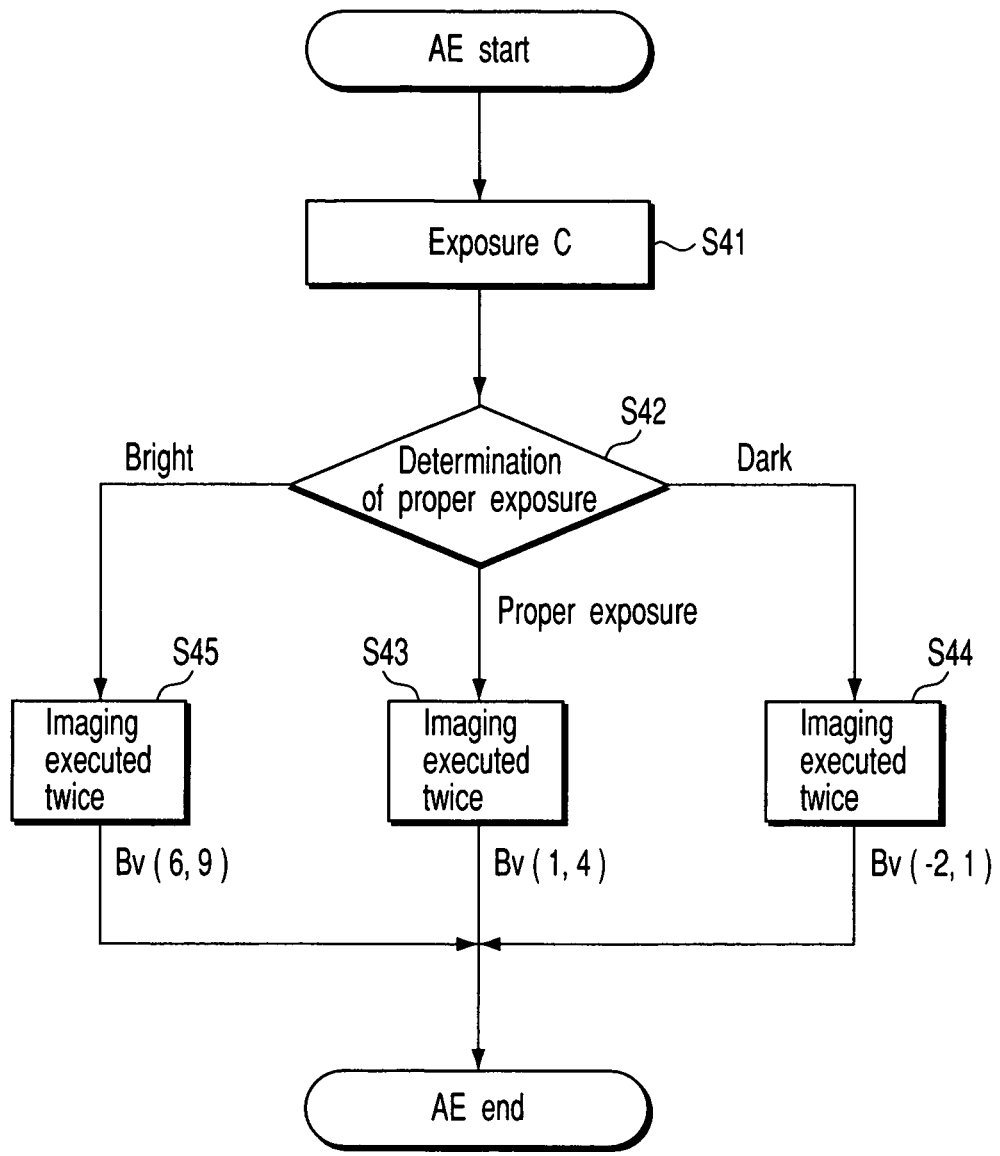
FIG. 12 is a flowchart explaining a third AE exposure processing mode executed by the electronic still imaging apparatus of FIG. 7.

That is, as shown in FIG. 12, preliminary imaging is executed first by selecting the exposure condition C (step S41).

Then, the weighed average value Y of object luminance is determined from an acquired pickup image, and it is determined whether the object has such brightness that it is properly exposed under the exposure condition C, the object is a brighter object, or it is a darker object (step S42).

When it is determined that the exposure condition C is proper to expose the object, an imaging exposure condition is determined assuming that Bv values are 1 and 4, and imaging is executed twice (step S43).

When it is determined that the object is the darker object, the imaging exposure condition is determined assuming that Bv values are 1 and −2, and imaging is executed twice (step S44).

When it is determined that the the object is the brighter object, the imaging exposure condition is determined assuming that Bv values are 6 and 9, and imaging is executed twice (step S45).

As described above, in the third exposure processing mode, the histogram analyzing step is omitted and adequate Bv values are selected from three sets of Bv values prepared previously based on the luminance value acquired by preliminary imaging executed once. Thus, it is not necessary to calculate Bv values individually, which permits the processing to be executed in a short time.

Figure 13:
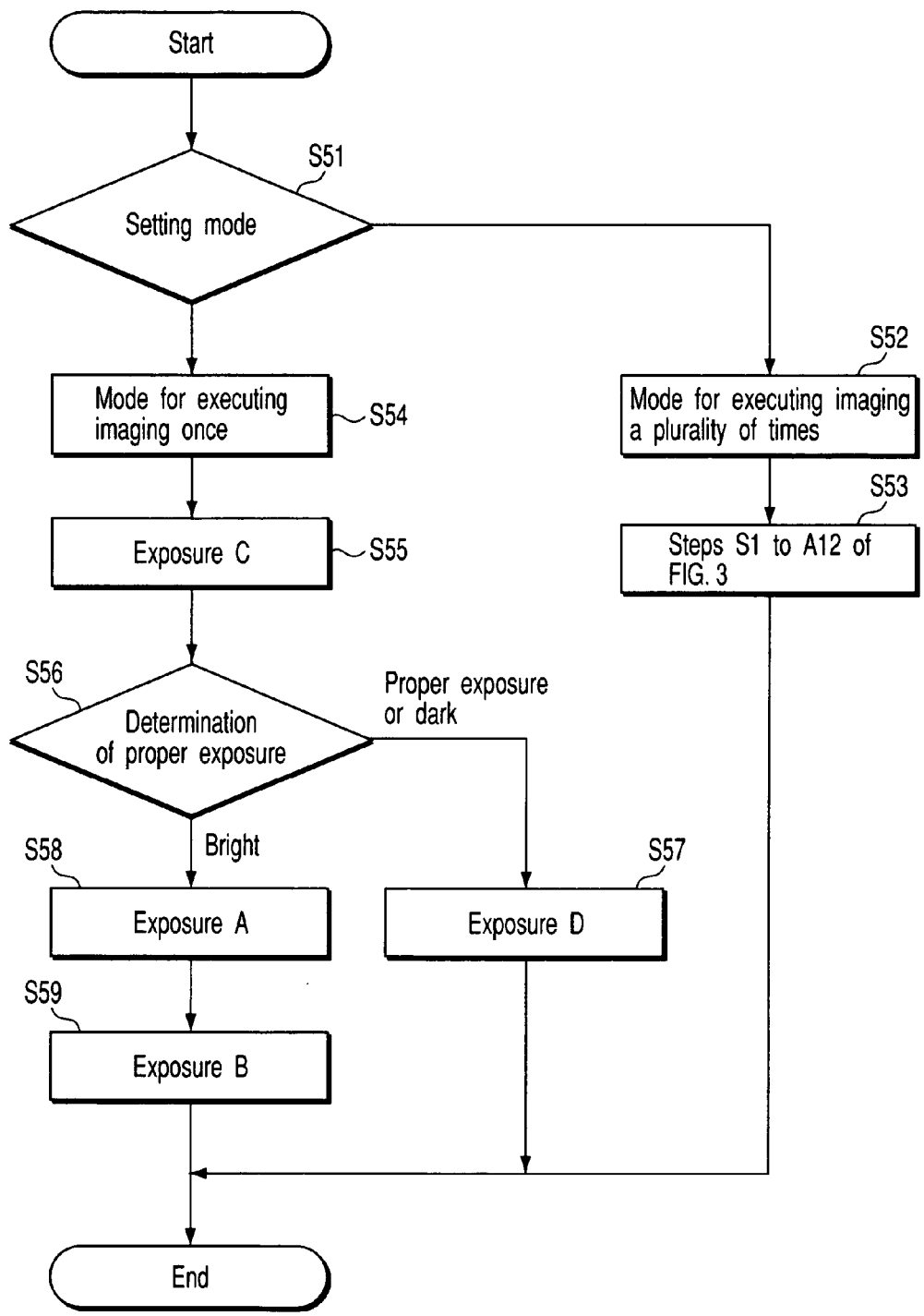
FIG. 13 is a flowchart explaining a fourth AE exposure processing mode executed by the electronic still imaging apparatus of FIG. 7.

Next, a fourth AE exposure processing mode will be explained with reference to the flowchart shown in FIG. 13.

In the fourth AE exposure processing mode, first, it is determined any one of an imaging mode for executing imaging once and an imaging mode for executing SL imaging a plurality of times is set by the input key (step S51).

When the mode for executing the SL imaging the plurality of times is set (step S52), final imaging is executed once to thrice based on preliminary imaging executed once under the exposure condition C in steps S1 to S12 in the the first exposure processing mode shown in the flowchart of FIG. 9 (step S53).

In contrast, when the imaging mode of the prior art for executing imaging once is set (step S54), first the exposure condition C is set and preliminary imaging is executed (step S55).

The weighed average value Y of object luminance is determined from an acquired pickup image, and it is determined whether the object has such brightness that it is properly exposed under the exposure condition C, the object is a brighter object, or it is a darker object (step S56).

Then, when it is determined that the object is properly exposed or the darker object, preliminary imaging is executed again under the exposure condition D (step S57).

Further, when it is determined that the object is the brighter object, preliminary imaging is executed under the exposure condition A (step S58).

Subsequently, preliminary imaging is executed under the exposure condition B (step S59).

The weighed average value Y is determined from the luminance values of the preliminary pickup images acquired under the exposure condition D or the exposure conditions A and B as described above, Bv values for a proper exposure condition are set based on the weighed average value Y, and an exposure condition for final imaging is determined based on the Bv values.

The fourth AE exposure processing mode includes the imaging mode determination step, and, when the mode for executing imaging once is set, preliminary imaging is executed four times as executed conventionally. However, an imaging condition is set accurately, and preliminary imaging is required only once when the SL imaging mode for executing SL imaging a plurality of times is set, thereby imaging can be executed accurately without increasing the shutter time lag.

As described above, according to the electronic still imaging apparatus according to the second embodiment of the present invention, the number of times of imaging executed aggregately is set based on the luminance value of the object acquired in preliminary imaging executed once. Therefore, the shutter time lag can be reduced as compared with a case where preliminary imaging is executed a plurality of times even in a case where imaging is executed a plurality of times under a different exposure condition.

Since preliminary imaging is ordinarily executed once and executed again only when it is necessary, the shutter time lag can be ordinarily reduced as well as the number of times of imaging executed aggregately can be properly set.

When imaging is executed aggregately, the exposure condition thereof can be properly set according to the object luminance.

Since the reference exposure values, which is used as a reference when the respective exposure conditions in the aggregate imaging are set, imaging can be executed with a proper difference between luminance values.

Since the reference exposure values are set based on the luminance value of the object acquired in preliminary imaging, a more proper imaging exposure condition can be set to the object.

Since the number of times of aggregate imaging is set based on the distribution of the luminance values of the blocks of an object acquired by preliminary imaging executed once, the number of times of imaging according to object luminance can be set by preliminary imaging executed once.

Since the ratios of the distributions of the block luminance values are calculated in the high and low luminance ranges, the distribution mode of the block luminance values can be properly confirmed, thereby the number of times of imaging can be more properly set.

Since imaging is additionally executed in correspondence to the high luminance region or the low luminance region depending on the ratio of the block luminance values in the high or low luminance region, the number of times of aggregate imaging can be set reflecting object luminance.

Since the respective exposure conditions of aggregate imaging are set based on the luminance value acquired in preliminary imaging executed once, the shutter time lag can be reduced as compared with a case where preliminary imaging is executed a plurality of times as in the prior art even in a case where preliminary imaging is executed a plurality of times.

Since one set of exposure values is selected as an exposure condition from a combination of a plurality of sets of exposure values prepared based on the luminance value acquired by preliminary imaging executed once, the processing can be executed in a short time as compared with a case where imaging exposure values are calculated individually as well as a possibility of occurrence of an error can be eliminated.

In the imaging method of executing aggregate imaging in which imaging is executed once or two or more times in order to synthesize a single image from a plurality of images exposed under a different exposure condition, the number of times of the aggregate imaging is set based on the luminance value acquired in preliminary imaging executed once, thereby the shutter time lag can be reduced as compared with a case where the number of times of imaging is set by executing preliminary imaging a plurality of times as in the prior art.

In the imaging method of executing aggregate imaging in which imaging is executed once or two or more times in order to synthesize a single image from a plurality of images exposed under a different exposure condition, the number of times of the aggregate imaging is set based on the luminance value acquired in preliminary imaging executed once, thereby the shutter time lag can be reduced as compared with a case where respective exposure conditions are set by executing preliminary imaging a plurality of times as in the prior art.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic still imaging apparatus comprising:
   an imaging element for acquiring an image of an object as image data;
   monitor means for controlling the imaging element and outputting a dynamic image to monitor the image of the object;
   detection means for detecting a shift vector from the output of the monitor means;
   exposure control means for controlling the imaging element and acquiring a plurality of original images whose exposure amounts are different from each other;
   a storage device which stores the plurality of original images acquired by the exposure control means;
   a positional displacement correcting device which obtains positional displacements of the plurality of original images stored in the storage device, on the basis of the shift vector detected by the detection means, and stores a plurality of corrected original images whose positional displacements are corrected based on the obtained positional displacements in the storage device through updating, wherein the shift vector is detected from an image other than the plurality of original images; and synthesis means for synthesizing an image whose dynamic range has been expanded from the plurality of corrected original images that are stored through updating.

2. The electronic still imaging apparatus according to claim 1, wherein the monitor mode is a movie output mode.

3. The electronic still imaging apparatus according to claim 2, wherein the movie output mode has no expanded dynamic range applied.

4. An electronic still imaging method comprising:
acquiring a dynamic image for monitoring an image of an object;
detecting a shift vector from the dynamic image;
detecting a luminance range in a picture to be imaged according to a result of preliminary imaging;
determining a number of times of an exposure which is executed by changing an exposure amount according to a detected luminance range;
storing a plurality of original images acquired by sequentially executing the exposure of a determined number of times, respectively;
detecting positional displacements of common objects included in the plurality of original images from the shift vector, and storing a plurality of corrected original images whose positional displacements are corrected based on detected positional displacements through updating; and
outputting an image signal whose dynamic range is expanded by synthesizing the plurality of corrected original images stored through updating, wherein the shift vector is detected from an image other than the plurality of original images.

5. An electronic still imaging method according to claim 4, wherein the luminance range is detected by analyzing a histogram.

6. An electronic still imaging method of outputting an image signal whose dynamic range is expanded by synthesizing partial image signals in respective image signals acquired by continuously executing imaging of a plurality of original images with exposure amounts different from each other, comprising:
acquiring a dynamic image for monitoring an image of an object, and detecting a shift vector from the dynamic image;
detecting a luminance range of the object and appropriately setting a number of. times of the imaging which is executed for the plurality of times according to a detected luminance range of the object; and
detecting the positional displacements of the object in imaging signals acquired by the imaging executed for the plurality of times from the shift vector and correcting and synthesizing the imaging signals of the plurality of times based on detected positional displacements, wherein the shift vector is detected from an image other than the plurality of original images.

7. An electronic still imaging apparatus comprising:
an imaging element for acquring animage of an object as image data;
monitor means for controlling the imaging element and outputting a dynamic image to monitor the image of the object;
detection means for detecting a shift vector from the output of the monitor means;
exposure control means for controlling the imaging element and acquiring a plurality of original images whose exposure amounts are different from each other;
storage means for storing a plurality of original images acquired by the exposure control means;
positional displacement correcting means for detecting positional displacements of common objects included in the plurality of original images stored in the storage means from the shift vector detected by the detection means and storing a plurality of corrected original images whose positional displacements are corrected based on detected positional displacements in the storage means through updating, wherein the shift vector is detected from an image other than the plurality of original images; and
synthesis means for synthesizing an image whose dynamic range has been expanded from the plurality of corrected original images that are stored through updating.

8. An electronic still imaging method comprising:
acquiring a dynamic image for monitoring an image of an object;
detecting a shift vector from the dynamic image;
continuously executing imaging of a plurality of times with exposure amounts different from each other;
storing a plurality of original images acquired by the imaging of the plurality of times, respectively;
detecting positional displacements of common objects included in the plurality of original images from the detected shift vector and storing a plurality of corrected original images whose positional displacements are corrected based on detected positional displacements through updating; and
outputting an image signal whose dynamic range is expanded by synthesizing the plurality of corrected original images stored through updating, wherein the shift vector is detected from an image other than the plurality of original images.

* * * * *